United States Patent [19]

Davis et al.

[11] Patent Number: 4,533,173

[45] Date of Patent: Aug. 6, 1985

[54] GUIDE RAIL FOR SLIDING ASSEMBLY

[75] Inventors: Bender A. Davis, Sandton; Hendrik A. Louw, Port Elizabeth, both of South Africa

[73] Assignee: Carvalette Services Africa (Proprietary) Limited, Johannesburg, South Africa

[21] Appl. No.: 488,859

[22] Filed: Apr. 26, 1983

[51] Int. Cl.³ .............................................. B60J 7/02
[52] U.S. Cl. ................................ 296/216; 403/331; 16/95 R
[58] Field of Search ............... 296/216, 218, 220, 222; 293/128; 403/331; 49/413, 440; 16/94 R, 95 R, 96 R

[56] References Cited

U.S. PATENT DOCUMENTS

| 2,190,462 | 2/1940 | Votypka | 296/216 |
| 3,352,600 | 11/1967 | Wilfert et al. | 296/216 |
| 3,982,783 | 9/1976 | Vermeulen | 296/216 |

FOREIGN PATENT DOCUMENTS

| 212679 | 5/1967 | Sweden | 296/216 |

Primary Examiner—Robert B. Reeves
Assistant Examiner—Dennis H. Pedder
Attorney, Agent, or Firm—Sughrue, Mion, Zinn, Macpeak & Seas

[57] ABSTRACT

A guide rail 1 for a sliding sun roof 2 of a motor vehicle has a first lower extrusion member 5 adapted to be secured to the vehicle roof 3 and a second upper extrusion member 6 adapted to be slidably engaged with the first member via mating flange lips. The assembled members form a guide channel 9 for a sun roof edge.

9 Claims, 2 Drawing Figures

GUIDE RAIL FOR SLIDING ASSEMBLY

BACKGROUND OF THE INVENTION

This invention relates to a guide rail for a sliding sun roof of a motor vehicle.

Guide rails of the aforesaid kind may comprise an open ended guide channel having an upper flange and a lower flange projecting from a base. The lower flange of such a guide channel usually extends beyond the upper flange to permit the channel to be secured to the roof of a vehicle, for example by means of rivets. A disadvantage associated with such an arrangement is that an additional beading or the like is required to be secured on the lower flange of the guide channel to cover the rivets. Also, a guide channel of the above kind is usually required to be three sided in cross-section with its sides at right angles to one another. Such a guide channel may detract from the aesthetic appearance of a sun roof on a motor vehicle.

SUMMARY OF THE INVENTION

It is an object of the invention to provide a guide rail in which the above disadvantages are at least diminished.

According to the invention a guide rail for a sliding sun roof of a motor vehicle comprises a first member adapted to be secured to the roof of the motor vehicle and having a first flange and a second member adapted to be engaged with the first member and also having a first flange, the first flanges of the first and second members in an operative arrangement of the guide rail forming a guide channel.

Further according to the invention the second member is provided with a second flange transverse to the first flange of the second member, the second flange being adapted to form a base to the guide channel formed by the first and second members in an operative movement of the guide rail.

Further according to the invention the first member is provided with an open ended channel formed by a pair of flanges directed in a direction transverse to the first flange, the open ended channel being adapted to accommodate means for securing the first member to the roof of the otor vehicle.

Further according to the invention the first and second members are provided with complementary formations adapted to be engaged with one another to permit sliding engagement of the second member with the first member, the formations on the first member comprising a lip on each of the flanges which form the open ended channel on the first member, the lips on the flanges being directed away from one another and are parallel to the first flange of the first member.

Further according to the invention the formations on the second member comprise a pair of lips directed towards one another and adapted to engage beneath the lips on the first member.

Further according to the invention the first flange of the second member forms one side of the second member, one of the lips on the second member extending inwardly from the other side of the second member, the other lip on the second member extending from the free end of the second flange on the second member.

Further according to the invention the portion of the second member between the second flange and the said other side thereof is curved in cross-section and is adapted to overlie the open ended channel of the first member in an operative arrangement of the guide rail.

Further according to the invention the first and second members are metal extrusions.

Further according to the invention a sun roof assembly for a motor vehicle comprises a sun roof and a pair of guide rails as defined above, the guide rails being adapted to receive opposite edges of the sun roof in the guide channels of the guide rails for sliding movement therealong.

Further according to the invention the guide rails are adapted to be secured to the roof of the motor vehicle by rivets.

BRIEF DESCRIPTION OF THE DRAWINGS

A preferred embodiment of the invention is described below by way of example with reference to the accompanying drawings in which.

DETAILED DESCRIPTION OF THE PREFERRED EMBODIMENT

Figure 2:
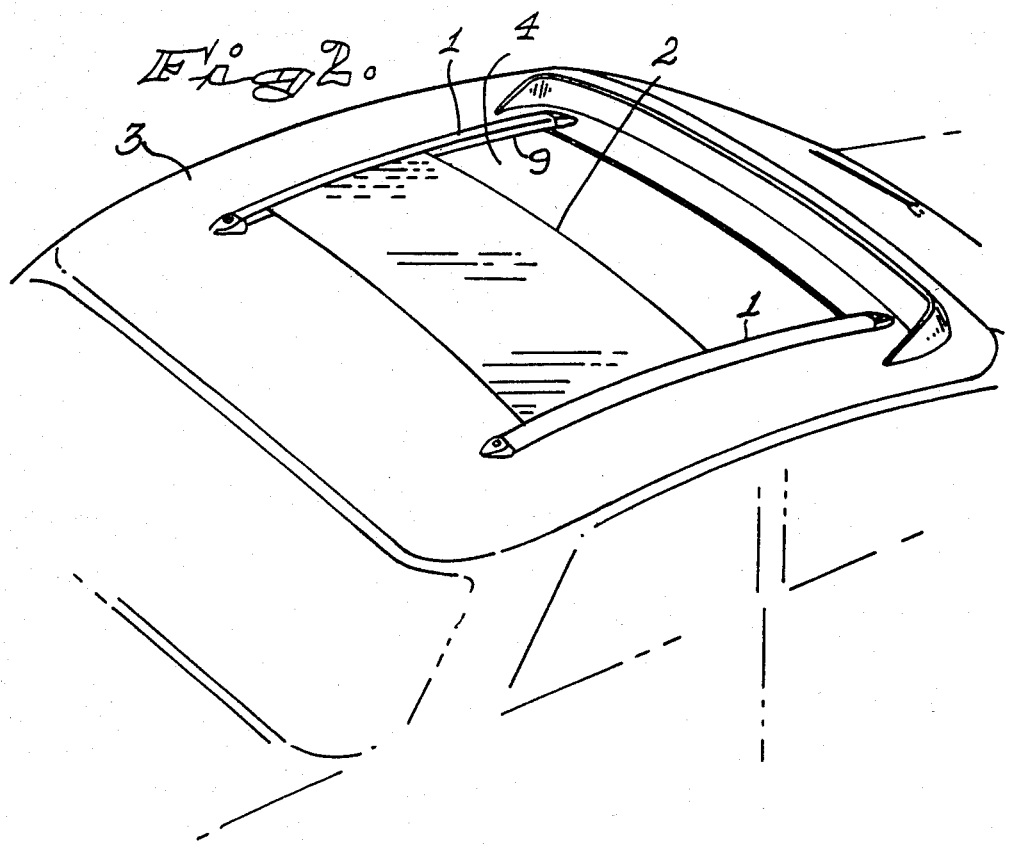
FIG. 2 illustrates the use of the guide rail in a sun roof assembly of a motor vehicle.

In this embodiment of the invention guide rails 1 according to the invention are used to guide a sliding sun roof 2 mounted in the roof 3 of a motor vehicle. As shown in FIG. 2 the guide rails 1 are mounted parallel to one another on opposite sides of an aperture 4 formed in the roof of the motor vehicle. The sun roof 2 is supported between the guide rails 1 and is capable of sliding movement along the guide rails 1 to open and close the aperture 4.

Figure 1:
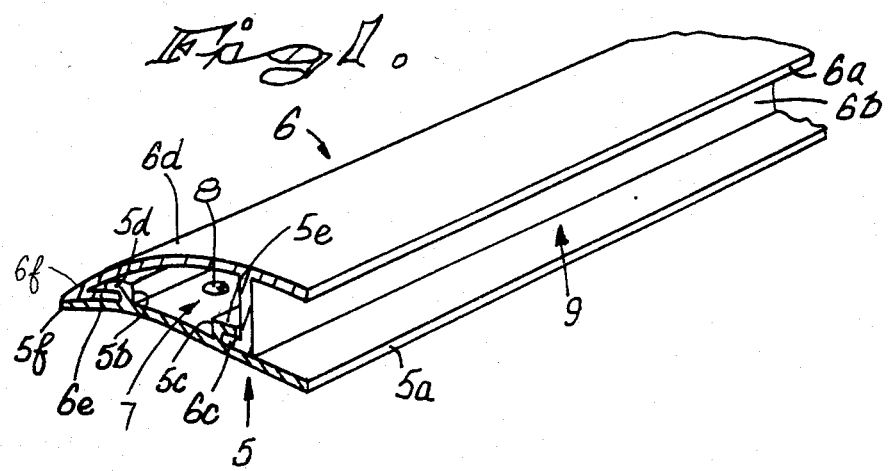
FIG. 1 is a broken perspective view of part of a guide rail according to the invention.

Referring to FIG. 1, each guide rail 1 comprises a first member 5 adapted to be secured to the roof 3 of the motor vehicle and a second member 6 adapted to be engaged with the first member 5. The members 5, 6 comprise lengths of extruded aluminium sections.

The first member 5 is provided with a horizontal flange 5a extending along the length of the first member 5. It is further provided with a pair of parallel upstanding flanges 5b, 5c forming a shallow open ended channel 7 extending along the length of the member 5 on its upper side. The member 5 is, in use, secured to the roof 3 of the motor vehicle by means of, for example, rivets 8 which are accommodated in the open ended channel 7. The flanges 5b, 5c are provided with lips 5d, 5e respectively which are directed away from one another and are parallel to the flange 5a.

The second member 6 is provided with a horizontal flange 6a extending along its length. The flange 6a terminates in a transverse flange 6b having a lip 6c directed in a direction opposite to that of the flange 6a and parallel thereto. The side 6f of the second member 6 remote from the flange 6a has a lip 6e extending inwardly therefrom. The portion 6d of the second member 6 between the flange 6b and the side 6f is curved in cross section.

In use, the first member 5 of the guide rail is secured to the roof 3 of the motor vehicle as described above on each side of the aperture 4. The second member 6 of the guide rail is then aligned with the first member 5 and the lips 6c, 6e of the member 6 are engaged beneath the lips 5e, 5d of the member 5. The second member 6 is thereupon slid along the first member 5 to engage the two members 5, 6 with one another. In view of the curvature of the roof 3 of the motor vehicle this sliding engagement may require a measure of force and at the same time ensures a tight fit between the two members 5, 6. When thus engaged the flange 5a of the member 5 and the flange 6a of the member 6 form a guide channel 9 for receiving an edge of the sun roof 2. The flange 6b of the member 6 forms the base of the guide channel 9.

The curved portion 6d of the member 6 overlies the open ended channel 7 of the member 5 and covers the rivets 8 securing the latter to the roof of the motor vehicle. There is therefore no need for any beading or the like to be used for this purpose. Moreover the curved portion 6d of the member 6 creates an aesthetic appearance for the guide rail, terminating flush with the outer edge 5f of the member 5.

Many other embodiments of the invention may be made differing in detail only from that described above and without departing from the scope of the invention described in the appended claims.

We claim:

1. A guide rail (1) for a sliding sun roof (2) of a motor vehicle, comprising: a first member (5) adapted to be secured to the roof (3) of the motor vehicle and having a first flange (5a), and a second member (6) adapted to be engaged with the first member and also having a first flange (6a) and a second flange (6b) generally perpendicular thereto, the first flanges of the first and second members and the second flange of the second member in an operative arrangement of the guide rail forming a guide channel (9) with the second flange being a base thereof, wherein the first and second members are provided with complementary formations adapted to be engaged with one another to permit sliding engagement of the second member with the first member, the first member being provided with an open ended channel (7) formed by a pair of flanges (5b, 5c) directed in a direction generally perpendicular to the first flange, the open ended channel being adapted to accommodate means (8) for securing the first member to the roof of the motor vehicle, the formations on the first member comprising a lip (5d, 5e) on each of the flanges which form the open ended channel on the first member, the lips on the flanges being directed away from one another and being parallel to the first flange of the first member, the formations on the second member comprising a pair of lips (6c, 6e) directed towards one another and adapted to engage beneath the lips on the first member.

2. A guide rail according to claim 1 in which the first flange of the second member forms one outward edge thereof, one of the lips (6e) on the second member extending inwardly from an opposite outward edge thereof, the other lip (6c) on the second member extending from the free end of the second flange on the second member.

3. A guide rail according to claim 2 in which a portion (6d) of the second member between the second flange and the opposite outward edge is curved in cross-section and is adapted to overlie the open ended channel of the first member in an operative arrangement of the guide rail.

4. A guide rail according to claim 1 in which the first and second members are metal extrusions.

5. A sun roof assembly for a motor vehicle, comprising: a sun roof (2) and a pair of guide rails (1) defining guide channels (9) adapted to receive opposite edges of the sun roof therein for sliding movement therealong, each guide rail comprising a first member (5) adapted to be secured to the roof (3) of the motor vehicle and having a first flange (5a), and a second member (6) adapted to be engaged with the first member and also having a first flange (6a) and a second flange (6b) generally perpendicular thereto, the first flanges of the first and second members and the second flange of the second member in an operative arrangement of the guide rail forming the guide channel with the second flange being a base thereof, wherein the first and second members of each guide rail are provided with complementary formations adapted to be engaged with one another to permit sliding engagement of the second member with the first member, the first member being provided with an open ended channel (7) formed by a pair of flanges (5b, 5c) directed generally perpendicular to the first flange, the open ended channel being adapted to accommodate means (8) for securing the first member to the roof of the motor vehicle, the formations on the first member comprising a lip (5d, 5e) on each of the flanges which form the open ended channel on the first member, the lips on the flanges being directed away from one another and being parallel to the first flange of the first member, the formations on the second member comprising a pair of lips (6c, 6e) directed towards one another and adapted to engage beneath the lips on the first member.

6. A sun roof assembly according to claim 5 in which the first flange of the second member of each guide rail forms one outward edge thereof, one of the lips (6e) on the second member extending inwardly from an opposite outward edge thereof, the other lip (6c) on the second member extending from the free end of the second flange on the second member.

7. A sun roof assembly according to claim 6 in which a portion (6d) of the second member of each guide rail between the second flange and the opposite outward edge is curved in cross-section and is adapted to overlie the open ended channel of the first member in an operative arrangement of the guide rail.

8. A sun roof assembly according to claim 5 in which the first and second members of each guide rail are metal extrusions.

9. A sun roof assembly according to claim 5 in which the guide rails are adapted to be secured to the roof of the motor vehicle by rivets.

* * * * *